United States Patent [19]
Stock et al.

[11] Patent Number: 5,862,287
[45] Date of Patent: Jan. 19, 1999

[54] APPARATUS AND METHOD FOR DELIVERY OF DISPERSION COMPENSATED ULTRASHORT OPTICAL PULSES WITH HIGH PEAK POWER

[75] Inventors: Michelle L. Stock; Mark P. Bendett; Almantas Galvanauskas; Donald J. Harter; Gregg D. Sucha, all of Ann Arbor, Mich.

[73] Assignee: Imra America, Inc., Ann Arbor, Mich.

[21] Appl. No.: 763,381

[22] Filed: Dec. 13, 1996

[51] Int. Cl.$^6$ .................................................. G02B 6/16
[52] U.S. Cl. ........................ 385/123; 359/161; 359/173; 359/332; 372/25
[58] Field of Search ..................... 385/123, 124; 372/22, 25, 29, 30, 6; 359/154, 161, 173, 326, 332, 333, 341

[56] References Cited

U.S. PATENT DOCUMENTS

| | | | |
|---|---|---|---|
| 4,918,751 | 4/1990 | Pessot et al. | 359/173 |
| 4,928,316 | 5/1990 | Heritage et al. | 359/154 |
| 5,499,134 | 3/1996 | Galvanauskas et al. | 359/333 |
| 5,541,947 | 7/1996 | Mourou et al. | 372/25 |
| 5,587,827 | 12/1996 | Hakimi et al. | 372/29 X |
| 5,696,782 | 12/1997 | Harter et al. | 372/25 |

*Primary Examiner*—John D. Lee
*Attorney, Agent, or Firm*—Sughrue, Mion, Zinn, Macpeak & Seas, PLLC

[57] ABSTRACT

An apparatus and method for delivery of high peak power pulse through an optical fiber to an optical device included an ultrashort pulsed laser source which produce ultrashort optical pluses having high peak power. Prior to transmittng the optical pulses through a delivery optical fiber, the pulse width of the optical pulses is streched, forming chirped optical pulses having a lower peak power. The stretched pulse are transmitted through an optical fiber which delivers the pulse to an optical device requiring ultrashort, high peak power optical pulses. The optical fiber and/or an output unit coupled to the end of the optical fiber introduces a dispersion which compensates for the dispersion introduced by the pulsed laser source and the stretcher, and delivers a recompressed optical pulse to an optical device. The optical fiber delivery system preferably pre-compensates for the dispersion introduced by optical components within the optical device, so that the optical pulses are fully recompressed at a point of interest within the optical device, such as at a specimen of at a detector. The optical fiber delivery system may include a frequency converter either before or after the delivery optical fiber. The frequency converter allows optical pulses having frequencies other than that generated by the laser source to be delivered to the optical device in an efficient manner.

33 Claims, 5 Drawing Sheets

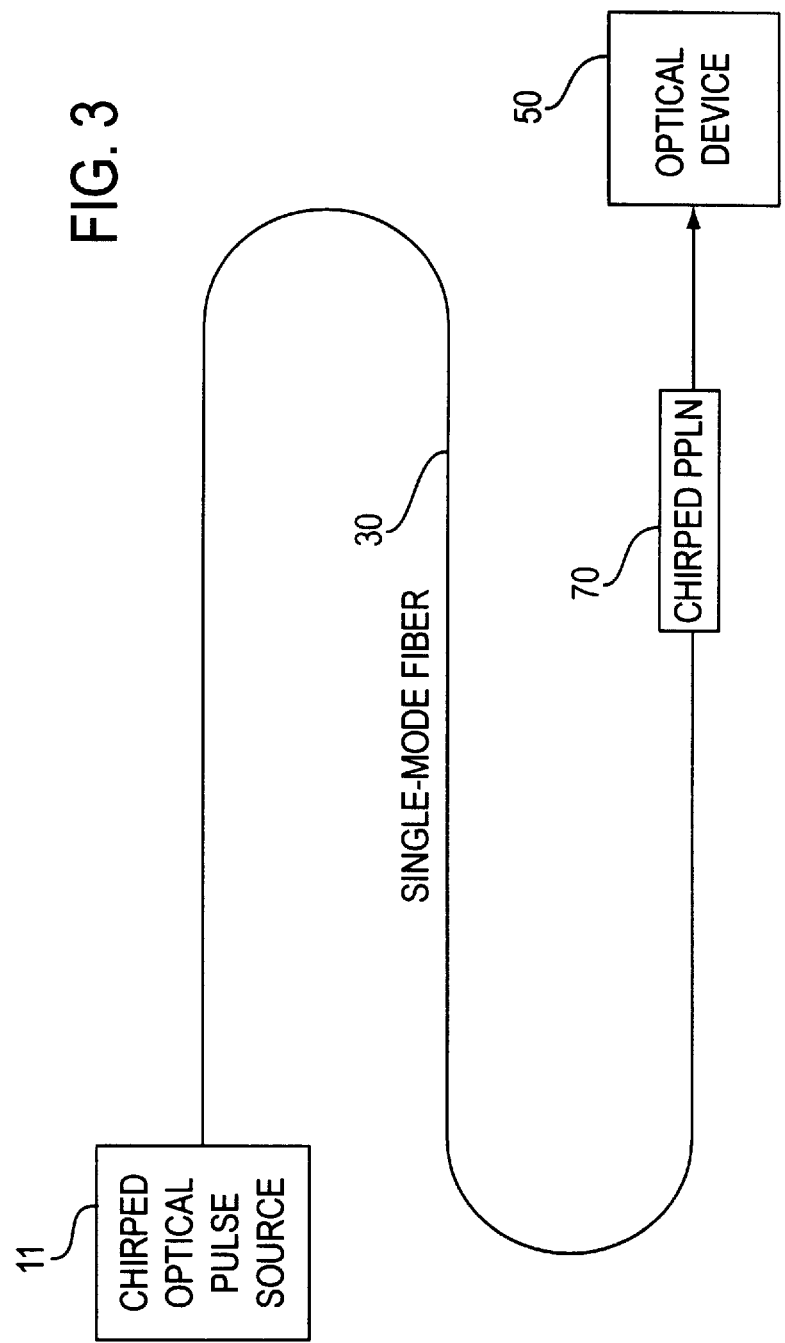

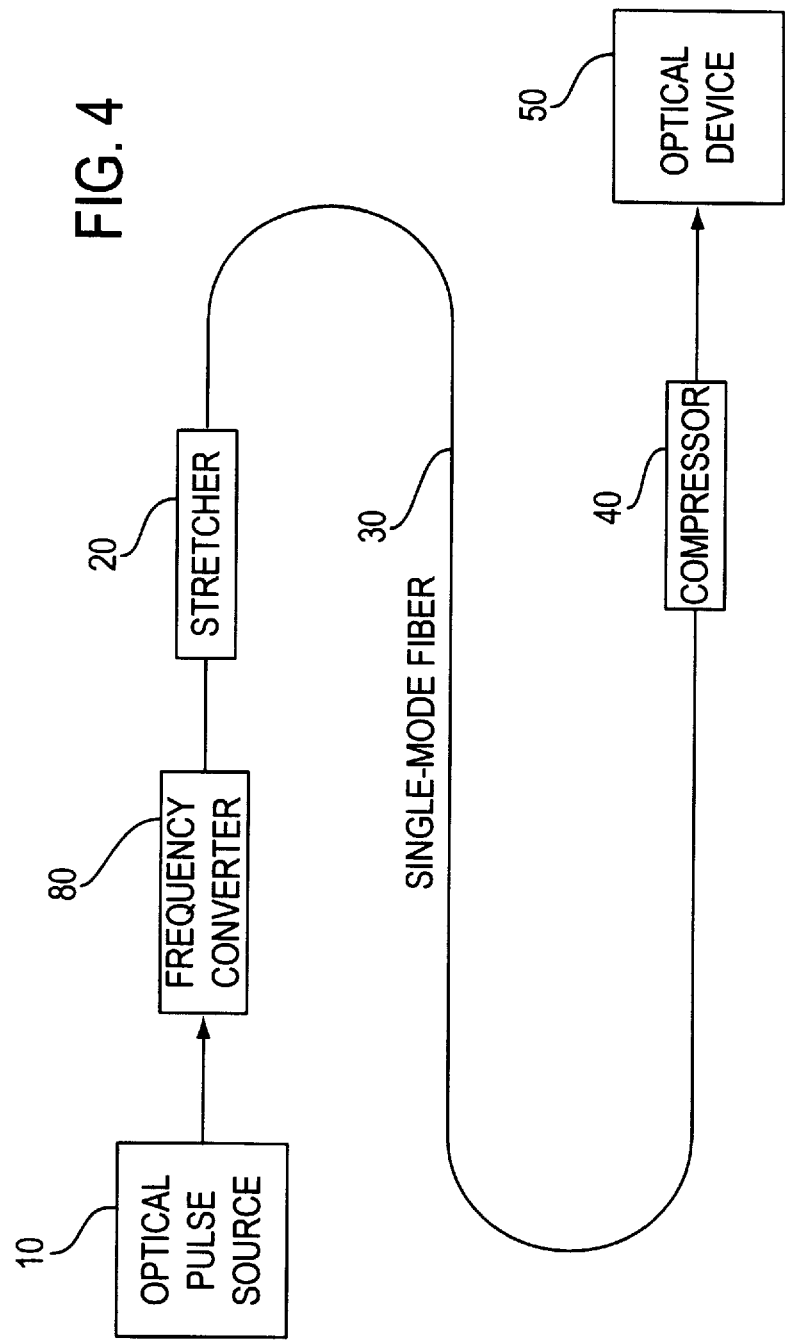

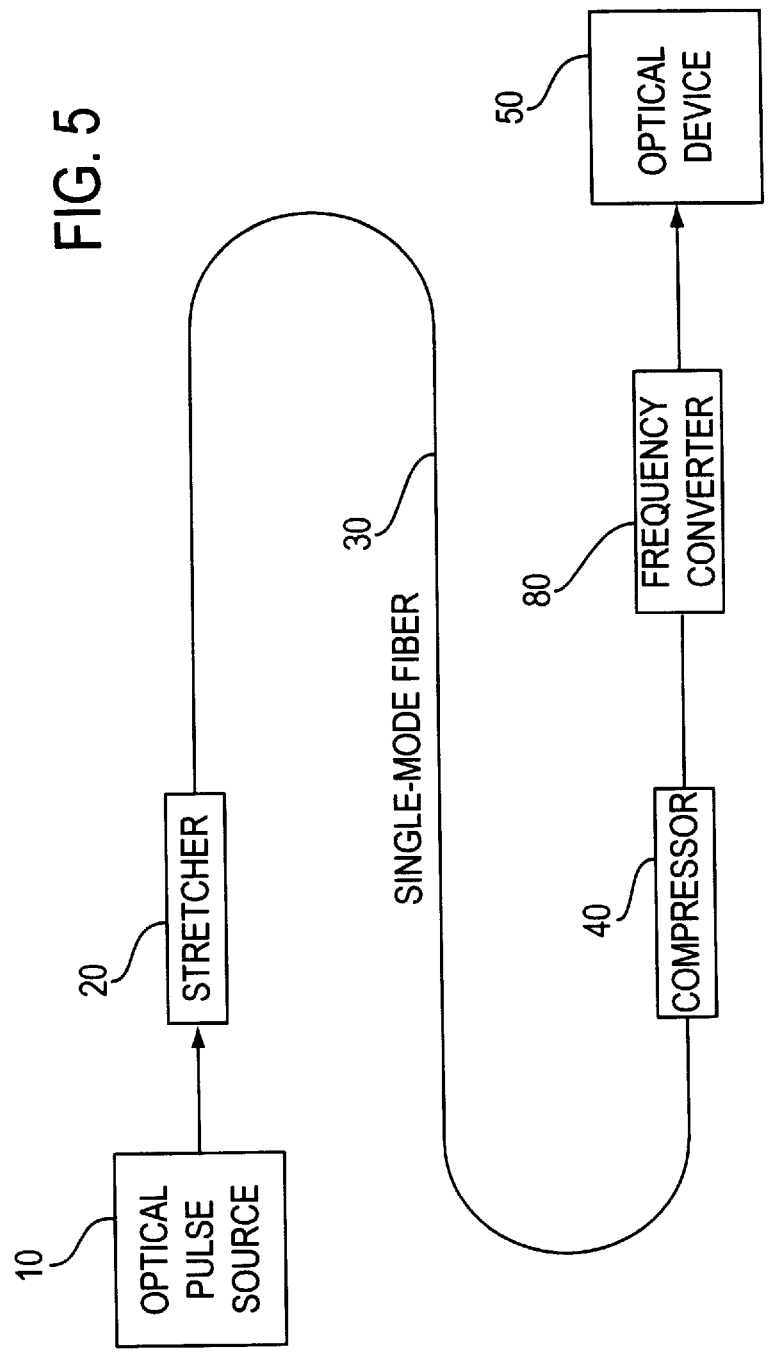

APPARATUS AND METHOD FOR DELIVERY OF DISPERSION COMPENSATED ULTRASHORT OPTICAL PULSES WITH HIGH PEAK POWER

BACKGROUND OF THE INVENTION

1. Field of the Invention

The present invention generally relates to an optical pulse delivery system for various types of optical devices, such as an optical measurement system, requiring ultrashort pulses with high peak power. More particularly, the present invention relates to an optical pulse delivery system which employs an optical fiber and which is capable of compensating for various dispersion effects within the system in order to deliver high peak power pulses.

2. Description of the Related Art

Ultrashort optical pulse sources are presently known to be capable of creating pulses having pulse widths of pincosecond to sub-picosecond duration at a variey of wavelengths, pulse energies, and repetition rates up to the Ghz regime. Such optical pulse sources are commonly used in measurement and imaging applications that require time gating or excitation by a high peak power or high intensity. Ultrashort optical pulses provide both high spatial and high temporal resolutions, as well as high peak powers in a focusable beam necessary for the excitation of certain non-liner events (such as the excitation of a multi-photon fluorescent medium). These capabilities find use in applications including biological and medical imaging, metrology, terahertz generation, photoconductive and electro-optical sampling, and optical time domain reflectometers.

Current techniques for the delivery of ultrashort optical pulses to a device under test or a measurement point include the use of optical components such as mirrors, lenses, optical fiber, beamsplitters, and dichroic elements. Ultrashort optical pulses passing through a delivery system made of such elements will experience a change in peak power as well as distortions in their temporal profile. These distortions may result in a reduction in resolution, or a degradation in signal-to-noise ratio. The changes in peak power and temporal shape of an ultrashort optical pulse signal propagating through an optical system are caused by losses and dispersion. In addition, at high peak powers, non-linear effects can distort the optical pulse.

An ultrashort optical pulse is made up of a certain range of optical frequencies (or wavelengths), which constitutes its bandwidth. The shortest pulse for a given bandwidth (the bandwidth-limited pulse) has all of its frequency components perfectly overlapped in time. In propagation through a system, the different wavelength components of a pulse experience different delays. These different delays will cause the above-mentioned distortion in temporal shape and change in peak power of ultrashort optical pulses. The result is a frequency chirped pulse, where instantaneous frequency is a function of time along the pulse.

Propagation through a common optically transparent material used to deliver optical signals, such as glass, will generally result in very small loss. However, due to the frequency dependent refractive index $n(\upsilon)$ of the medium, which gives the velocity, v, 2 of propagation of the optical signal by the relationship $v=c/n\ n(\upsilon)$, where c is the speed of light in a vacuum, different wavelengths, $\lambda$, experience different velocities in the material, where wavelength is related to frequency by $\lambda=c/\nu\upsilon$. This effect is referred to as chromatic dispersion. Through the interaction of a pulsed optical signal and such a material, pulse broadening can occur due to group velocity dispersion (GVD). This effect causes the lower frequency components and the higher frequency components of the bandwidth to arrive at different times after passing through the dispersing medium. The effect may be that the lower frequency components arrive earlier or later, depending upon the sign of the dispersion. In glass, for wavelengths shorter than the zero-dispersion wavelength (~1300 nm), the sign of the dispersion is positive, and higher frequencies of the optical pulse travel more slowly than lower frequencies. Above the zero-dispersion wavelength, the sign of the dispersion is negative, and lower frequencies of the optical pulse travel more slowly than higher frequencies. Therefore, any optical element through which the ultrashort optical pulse is transmitted may potentially have a distorting effect.

Dispersion manipulation may be performed with several well known optical elements and systems. These include glass prisms, diffraction gratings, fiber gratings, and optical fiber. These elements allow for both signs of dispersion to be reached at any wavelength, as well as allowing for compensation of frequency chirp. Glass prism pairs can be used to create a dispersive delay line, where, by varying the distance between the two prisms, different amounts of dispersion can be achieved. Similarly, using either reflective or transmissive diffraction gratings, variable amounts of both positive and negative dispersion can be provided. Fiber gratings are chirped Bragg gratings written in the core of an optical fiber. In a chirped fiber grating, dispersion is achieved by reflecting different wavelengths at different locations in space, thereby adding different time shifts to different wavelength components. Specialty fibers can be made for wavelengths longer than ~1300 nm. These fibers use waveguide dispersion in conjunction with material dispersion to create tailored dispersion which may be positive, negative, or close to zero.

Of the commonly used optics for beam steering in an optical system, optical fibers are a convenient method of delivery in practical systems, particularly those where the laser source is bulky. Optical fibers offer increased reliability and robustness, by allowing for stable pre-alignment of components. By providing confinement of the laser light, optical fiber delivery allows for placement of the laser source in more diverse environments than the typical laser laboratory, as well as allowing for convenient placement of the source of light with respect to the rest of the system, providing more flexibility in system design. Additionally, the optical fiber can be disconnected without disturbing the alignment of the laser source and the optical device; thus, the two systems can be pre-aligned and shipped separately in different boxes. However, optical fibers can distort the temporal profile of ultrashort optical pulses, as described below.

Optical fibers can be characterized as being single-mode (capable of propagating a single spatial mode) or multi-mode (capable of supporting the propagation of many spatial modes) for wavelength $\lambda$. Considering the single-mode case, the properties of optical fiber pulse propagation include: a frequency dependent loss, material dispersion giving rise to pulse broadening, and waveguide dispersion. At the "zero dispersion" point where the material dispersion changes sign (for instance, in standard telecommunications fiber, at ~1300 nm) pulses may propagate without significant broadening. However, as the material dispersion effect decreases, waveguide dispersion becomes significant, arising from the confinement of the mode at the core-cladding interface. In multi-mode fiber, the situation is further complicated by the addition of many spatial modes which may produce further temporal broadening. However, multi-mode fiber is of interest in a number of applications due to its higher tolerance to misalignment.

In long-haul fiber-optic telecommunications systems, there exists the problem of high bit-error-rates due to broadening of optical signal pulses along the long optical fiber delivery lengths. This problem has been addressed using various schemes, including dispersion compensation by using specially designed optical fibers, pre-chirping of the pulses, possibly using optical fiber gratings for either of these techniques. However, the peak powers of the signals used in these systems are below the onset of non-linear effects; these systems do not address the delivery of high peak power (high peak power is herein defined as >1 kW) pulses through the optical fiber.

One system that requires the delivery of optimized pulse widths is that of a two-photon laser microscope. As disclosed by Denk, et al. in U.S. Pat. No. 5,034,613, such a system comprises a laser scanning microscope, a fluorophore having the appropriate emmision with long wavelength(red or ingrared) illumination as a stain for a sample, a picosecond or sub-picosecond laser source of appropriate wavelength, a detector for the emission of the fluorophore, and signal processing provided by a computer. Although several different sources have been used to provide ultrashort pulses including Ti:Sapphire and Cr:LiSAF, the delivery of the high peak power pulses has been made in "free space". In one such system reported by M. Muller et al. in "Measurement of Femtosecond Pulses in the Focal Point of a High-Numerical-Aperture Lens by Two-Photon Absorption", *Optics Letters,* Vol. 20, No. 9 (1995), the microscope objective was found to distort the pulses incident upon the lens, broadening the pulses appreciably.

Another example of an application that requires optimized pulses is optical metrology. In optical metrology, measurement of a physical parameter is made in a non-destructive, non-contact manner using an optical measuring device. The device includes a source of optical pulses, a delivery mechanism, and a probe that is inserted in such a way that the light source illuminates an object to be measured and its reflection is captured for signal processing. A convenient manner of delivering the light from the pulsed source is to provide the light through optical fiber which is incorporated into the probe. The probe may then be constructed to be convenient for mounting into a measurement system, bringing the probe into approximate contact with the sample. In this system, the resolution is dependent upon achieving the high peak power (shortest) pulse at the measurement point, which is in the doubling crystal of an auto-correlator or cross-correlator within the measurement system. However, optical fiber delivery alone creates a condition that is not optimized to deliver the shortest pulses to that point.

Other systems have utilized some form of optical fiber delivery of modelocked pulses to a sample under investigation. In particular, in International Application No. PCT/US 92/03536, Huang et al. describe a system for optical coherence domain reflectometry, which includes optical fiber delivery of a short coherence length source to the sample under measurement. Such a source may be either a broadbandwidth, superluminescent source or an ultrashort pulse (and thus broad-bandwidth) modelocked source. In the measurement technique, there exists a reference and a sample path which are arranged as an interferometer (the two paths must create optical interference in order to obtain the measurement information). A necessary condition for this interference to occur is that the optical path lengths from the source to the reference and from the source to the sample must be nearly equal, a condition described by: $L_{ref} - L_{sample} \sim L_{coherence}$, where $L_{ref}$ is the optical path length from the source to the reference, $L_{sample}$ is the optical path length from the source to the sample, and $L_{coherence}$ is the coherence length of the optical source. This condition must be true for all wavelengths. Here, it is recognized that, if the length of optical fiber in one leg of the system is shorter than the other, for say light on the blue side of the spectrum, another optical material of known higher GVD and shorter length may be added to the shorter arm to equalize these optical path lengths, thus compensating the relative length as a function of wavelength. This compensation is performed to ensure that each component wavelength in the broad bandwidth light arrives at the end points of the two optical paths at the same time (i.e. the shortest wavelengths, the middle wavelengths, and the longest wavelengths arrive at the same time). For use with a modelocked source, the pulse widths need not be short. However, the chirp is the same for pulses from each path.

In a similar system reported by Bouma et al. in "High Resolution Optical Coherence Tomographic Imaging Using a ModeLocked Ti:Al$_2$O$_3$ Laser Source", *Optics Letters,* Vol. 20, No. 13 (1995), optical coherence tomographic imaging is performed using a modelocked Cr:Forsterite laser. Again, the optical bandwidth of the laser is of primary importance to the imaging technique. Therefore, the limited bandwidth of the Cr:Forsterite was enhanced by using the well-known method of generating bandwidth in optical fiber using self-phase modulation. Thus, an optical fiber was added between the output of the laser and the input of the imaging system, providing the side benefit of ease of alignment. Here, however, there was no need, nor intent, to provide optimized pulse widths to the sample under investigation. In fact, to achieve the shortest pulses it is normally desired to avoid self-phase modulation.

Another system that takes advantage of optical fiber delivery is described by Harris in U.S. Pat. 5,120,953. Here, light is delivered to a sample in a scanning confocal microscope via an optical fiber, and the back-scattered signal generated at the sample is collected in the same optical fiber for detection. The optical fiber is used to eliminate rigid positional requirements on the confocal imaging optics in the path of the microscope and to act as a spatial filter for the input light mode and the back-scattered signal light. There is no concern for the pulse width of the light in such a system, due to the fact that single-photon fluorescence is the source of the signal, which fluorescence is proportional to the average power rather than intensity of the light incident upon the sample. That is why CW lasers rather than pulsed sources are used for this application.

In an optical measurement system such as the scanning confocal microscope, optical fiber delivery is particularly advantageous. A particular measurement system might incorporate an ultrafast light source coupled to an optical system via a delivery fiber. In the case of two-photon microscopy, it is essential to deliver to the sample light pulses having high peak power with low total energy. The laser intensity (i.e. W/cm$^2$) must be high enough for two photon absorption to proceed at an acceptable rate. However, above a certain energy level, pulses can cause photobleaching and possibly damage to the sample. Accordingly, there is a need to provide a measurement system with an ultrashort pulse light source which delivers a short duration high peak power but low total energy pulse.

SUMMARY OF THE INVENTION

It is an object of the present invention to deliver high peak power pulses through an optical fiber into an optical device, such as a measurement system, wherein the pulse shape characteristics of the high peak power pulses are optimized at a desired point of interaction.

Another object of the present invention is to control the dispersion effects within an optical pulse source and/or a delivery optical fiber in order to compensate for the dispersion effects in an optical device, such as an optical measurement system.

It is a further object of the present invention to avoid pulse distortion caused by the non-linear effects which result when high peak power pulses are propagated through an optical fiber delivery system.

To achieve the above objects, the present invention includes an ultrashort pulsed laser source which produces ultrashort optical pulses having high peak power. Prior to transmitting the optical pulses through a delivery optical fiber, the pulse width of the optical pulses is stretched, forming chirped optical pulses having a lower peak power. The pulse stretching may be performed within the laser or by a separate stretcher unit. A chirp of the optical pulses coming directly from the laser source can be used with or without other dispersion devices (i.e. holographic gratings, optical fiber gratings, metallic gratings, optical fiber, specialty optical fiber, or prisms).

The stretched optical pulses are transmitted through an optical fiber which delivers the pulse to an optical device requiring ultrashort, high peak power optical pulses. Because the peak power of the optical pulses is reduced by the stretching of the pulse width, the non-linear effects experienced by high peak power pulses in optical fibers is avoided. The optical fiber and/or a pulse compressor introduce a dispersion which compensates for the dispersion introduced by the pulsed laser source and the stretcher, and delivers a recompressed optical pulse to an optical device. The optical fiber delivery system preferably pre-compensates for the dispersion introduced by optical components within the optical device, so that the optical pulses are fully recompressed at a point of interest within the optical device, such as at a specimen or at a detector.

The present invention can be used to deliver high peak power pulses (>1 kW) through an optical fiber to a test specimen in a measurement system, such as a stained biological tissue for two-photon confocal microscopy or to the surface of an object so that its position can be measured by an autocorrelation technique.

Additionally, the optical fiber delivery system of the present invention may include a frequency converter either before or after the delivery optical fiber. The frequency converter allows optical pulses having frequencies other than that generated by the laser source to be delivered to the optical device in an efficient manner.

A chirped periodically poled non-linear frequency converter, such as a periodically poled lithium-niobate crystal (PPLN), may be used as both a frequency converter and the stretcher (or compressor). The PPLN is capable of producing a pulse whose frequency is double that of the incident pulse, and the frequency chirp of the crystal can be designed to match the sign and the magnitude of the dispersion of the compensating components, as required.

BRIEF DESCRIPTION OF THE DRAWINGS

The above and other objects and advantages of the present invention will become more apparent and more readily appreciated from the following detailed description of the presently preferred exemplary embodiments of the invention taken in conjunction with the accompanying drawings, of which:

FIG. 3 is a diagrammatic view of an optical fiber delivery apparatus according to the second embodiment of the present invention;

FIG. 4 is a diagrammatic view of an optical fiber delivery apparatus according to the third embodiment of the present invention; and FIG. 5 is a diagrammatic view of another arrangement of an optical fiber delivery apparatus according to the third embodiment of the present invention.

DETAILED DESCRIPTION OF THE PREFERRED EMBODIMENTS

Figure 1:
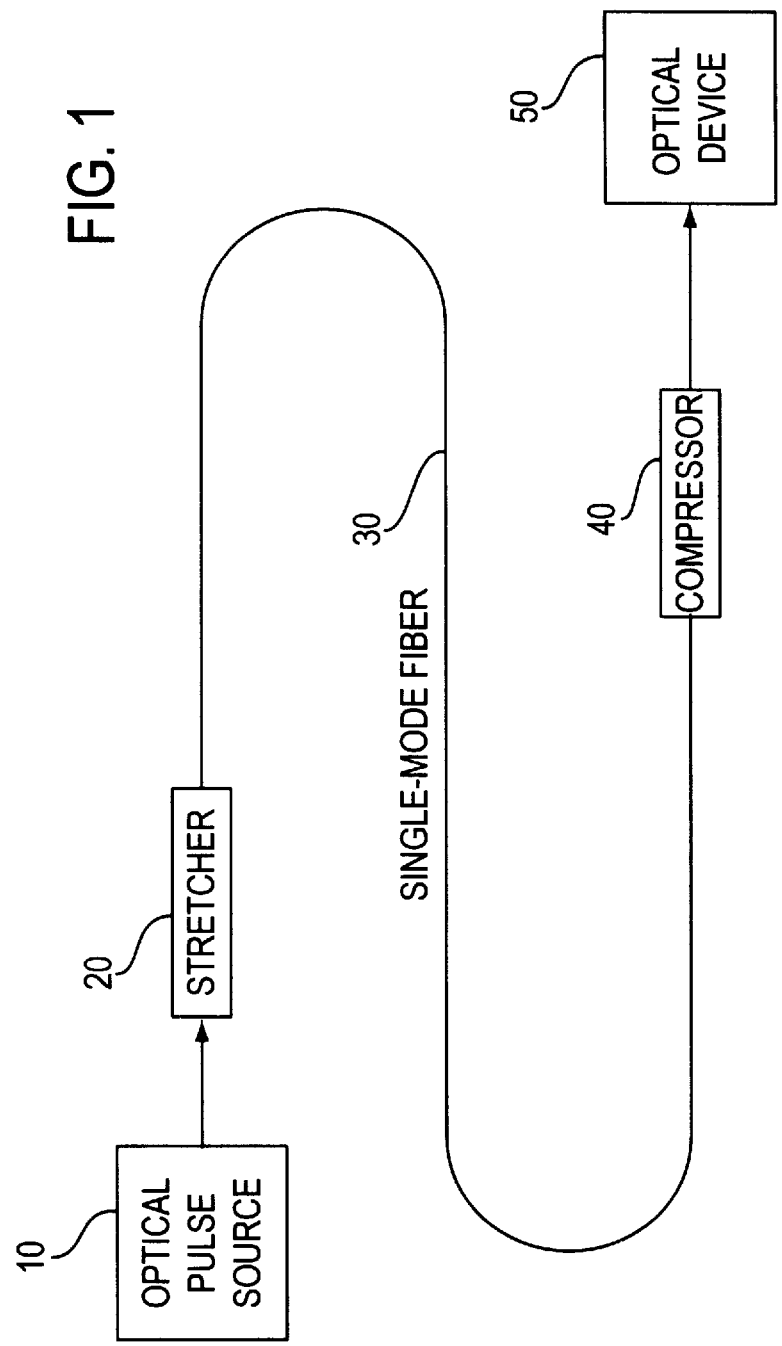
FIG. 1 is a diagrammatic view of an optical fiber delivery apparatus according to a general embodiment of the present invention.

FIG. 1 illustrates the configuration of an optical fiber delivery apparatus according to a general embodiment of the present invention. As shown in FIG. 1, an optical pulse source 10 generates optical pulses having high peak power. The optical pulse source 10 can be, for example, a passively modelocked fiber laser, and may include an oscillator and an amplifier. The ultrashort optical pulses produced by optical pulse source 10 have a pulse width which may be less than 100 PS and a peak power which may be more than 1 kW. An erbium-doped fiber laser is preferable because the wavelength (1.55 $\mu$m) of the light generated therefrom is suitable for use with both positive and negative dispersion optical fiber as well as low dispersion optical fiber.

The optical pulses are introduced from the optical pulse source 10 to a pulse stretcher 20. The pulse stretcher 20 may comprise any of the following: an optical fiber, chirped optical fiber Bragg gratings, a diffraction grating pair, or a prism pair. The pulse stretcher 20 extends the pulse width of the incident optical pulses, forming a chirped optical pulses. Due to the extension of the pulse width, the peak power of the optical pulses is reduced. The stretched optical pulses are then transmitted through a single-mode fiber 30 which delivers the optical pulses to a desired location. Single-mode fiber is preferred over multimode fiber in that the different modes of a multimode fiber have different propagation lengths, which leads to pulse breakup.

Typically, single-mode fibers are not suitable for transmitting optical pulses having high peak power, because high peak power leads to distortions caused by strong non-linear effects and causes a reduction in peak power.

The arrangement of the general embodiment overcomes this problem, because the high peak power of the optical pulses generated by optical pulse source 10 is reduced prior to introducing the pulses into the single-mode fiber 30. That is, the peak power of the optical pulses is reduced in the process of stretching the pulse with pulse stretcher 20. Consequently, the optical pulses are not severely distorted by non-linear effects and do not suffer a reduction in peak power as they propagate through the single-mode fiber 30.

A compressor 40 operates to compress the pulse width of the optical pulses which have been transmitted through the single-mode fiber 30. In the general embodiment, the compressor may be an optical fiber, a diffraction grating pair, chirped optical fiber Bragg gratings, or a prism pair. One possibility is that optical fiber 30 is itself the compressor. In this case, in order fully to recompress the optical pulses to their original bandwidth and peak power at a desired point of interaction within the optical device 50, the chirp (i.e., dispersion) within the length of single-mode fiber 30 and through the optical device 50 must be equal and opposite to that incident on fiber 30 (i.e., equal and opposite to the chirp introduced by the optical pulse source 10 and/or pulse stretcher 20). Accordingly, a length of the single-mode fiber 30 may be designed to compensate for the total dispersion of the system, from the optical pulse source 10 to the optical device 50, inclusive. The single-mode fiber 30 is of opposite dispersion to the pulse stretcher 20 and will preferably be of high dispersion in order to minimize the length for non-linear effects. The optical device 50 has known dispersion, providing the final compression of the high peak power pulse at a desired point within the optical device 50, such as the measurement point or at the detector.

Although the optical pulse source 10 and the input unit 20 are shown in FIG. 1 as separate units, the optical pulse source 10 may produce chirped optical pulses, and may not require a separate pulse stretcher. That is, the chirped optical pulses produced by such a laser source may have peak power and pulse width characteristics that do not require the use of a separate stretcher to expand the pulse width and to reduce peak power.

The apparatus of the general embodiment solves two key problems. First, the dispersion of the delivery optical fiber is compensated so that the shortest pulse duration (and the highest peak-power) are achieved at the desired point in the optical device 50, such as at a measurement point or at a detector. Second, high peak power optical pulses are delivered from an optical fiber delivery system without distortions caused the non-linear effects ordinarily suffered by high peak power pulses in optical fibers.

Specifically, the onset of non-linear effects such as Raman generation and self-phase modulation will distort and broaden optical pulses. In optical fibers, the detrimental effect of these interactions can be neglected if the dispersion length, $L_d = T_o^2/|\beta_2|$ of a pulse in an optical fiber is shorter than the non-linear length $L_n = 1/gP_o$: $L_d/L_N < 1$, where $|\beta_2|$ is the magnitude of fiber dispersion coefficient, $\gamma$ is the optical fiber non-linearity coefficient, Po is peak power of the laser pulse and $T_o$ is the compressed-pulse duration. The dispersion length $L_d$ and the non-linear liner length $L_n$ provide the length scales over which the dispersive or non-linear effects become important for pulse evolution along an optical fiber. In other words, if the dispersion length is shorter than the non-linear length, then pulses get stretched or compressed much faster than non-linear effects would cause temporal and spectral distortions.

Laser pulses with a peak power of >1 kW can not propagate within an optical fiber with little dispersion because $L_d/L_N > 1$. However, by propagating a chirped pulse (i.e., a pulse that has been stretched by the optical pulse source 10 or pulse stretcher 20, the peak power is reduced and thus the non-linear length increases without changing the dispersion length. Then, for example, an optical fiber with significant optical fiber dispersion (short dispersion length) can be used to recompress the pulse. Consequently, the optical pulse will be short only at the end of the optical fiber and will have high peak power there.

The present invention can provide dispersion compensation for positive or negative dispersion effects. This allows for flexible optimization which can be calibrated to the optical path of the system so that a system user may provide the proper pre-compensation for an adjustable system, e.g., the microscope objectives in a turret in a two-photon laser scanning microscope. Such methods bring increased flexibility, robustness, and reliability to system design, as well as improved signal-to-noise ratio and resolution in the overall system.

The compensation method according to the present invention can be elucidated by considering as an example an erbium-doped modelocked optical fiber laser. The emission wavelength of this type of laser is around 1550 nm, which experiences anomalous, or negative, dispersion when propagating in a standard single-mode optical fiber. The zero dispersion point (between the two regimes of dispersion) occurs around 1300 nm. However, waveguide dispersion can be strong in the region around the zero dispersion point. It is in fact possible to change the sign of the dispersion experienced by 1550 nm by appropriate waveguide design. Therefore, optical fiber of both signs of dispersion may be fabricated. In an erbium-doped modelocked optical fiber laser design, it is possible to use optical fiber of both signs of dispersion. The output pulse may therefore be tailored to have a certain residual dispersion, which may, in combination with an optical fiber in the delivery path, then be optimized to be equal and opposite to that encountered within the optical device 50.

To achieve very high peak power optical pulse, a chirped pulse amplification (CPA) optical fiber delivery system can be implemented using an amplifier between the pre-compensation (stretching) and compressing stages, and the system can be used for optical fiber delivery to a measurement device for certain applications. The CPA optical fiber delivery system uses a single pass amplifier and a polarization maintaining amplifier fiber for the delivery fiber if polarization at the output must be preserved, which is normally the case. Using CPA, the optical fiber delivery system of the present invention is capable of delivering optical pulses with peak power powers between $2 \times 10^4$ and $7 \times 10^7$ Watts.

Often, the frequency of the light generated by the optical pulse source 10 must be converted to a different frequency before impinging onto the sample. Accordingly, the optical fiber delivery system of the present invention can include a frequency conversion crystal.

Figure 2:
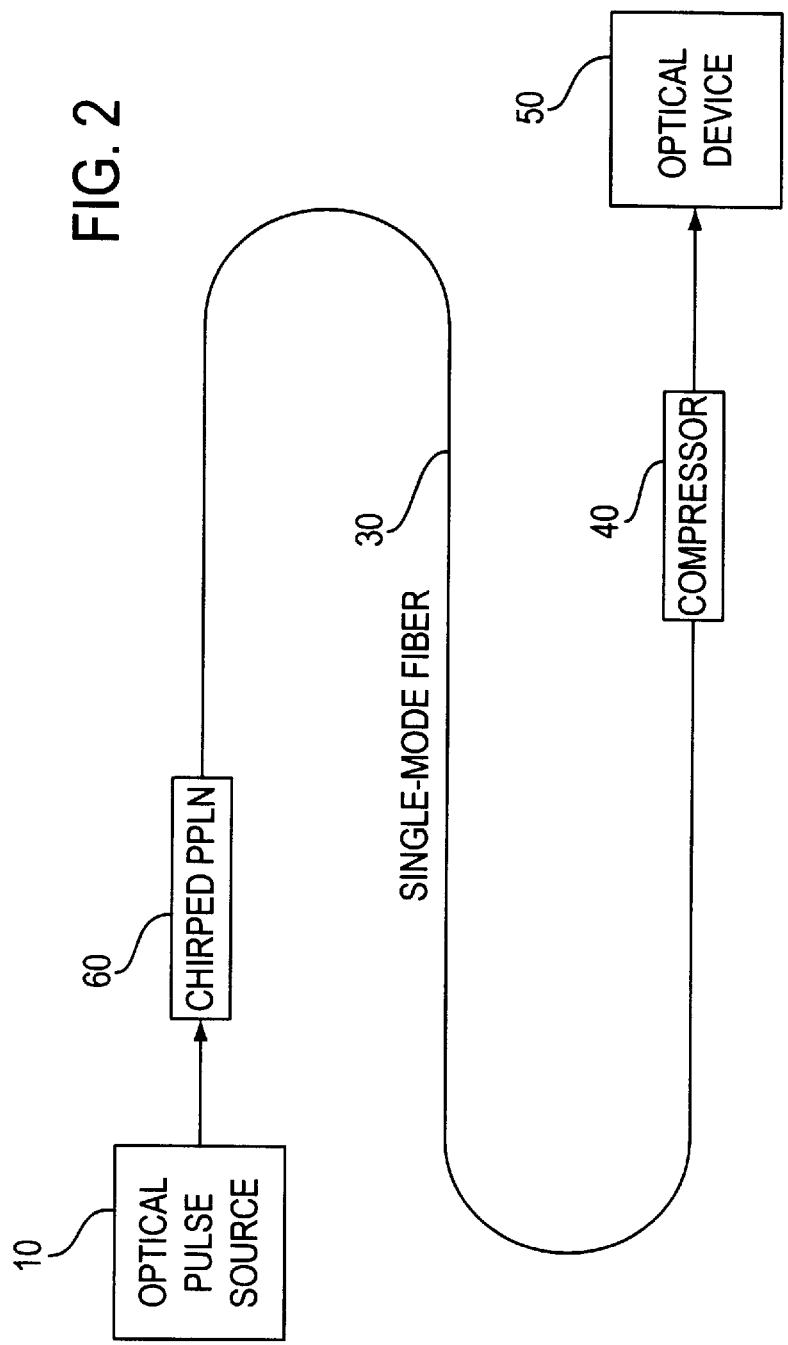
FIG. 2 is a diagrammatic view of an optical fiber delivery apparatus according to the first embodiment of the present invention.

FIG. 2 illustrates the configuration of an optical fiber delivery apparatus according to the first embodiment of the present invention. As shown in FIG. 2, optical pulses from optical pulse source 10 are introduced to a chirped PPLN 60 which performs both frequency conversion and pulse stretching.

Chirped PPLN 60 is a chirped periodically poled non-linear frequency converter. The utilization of chirped quasi-phasematched gratings for recompression of ultrashort pulses during doubling was first suggested in talks by Byer (CLEO Pacific Rim July '95), then Fejer (CLEO May '96) and finally in more detail by Arbore, Fejer, Harter, Marco, and Fermann (CNOM Annual meeting September '96). The ability to perform chirp compensation and frequency conversion in a chirped quasi-phasematched (QPM) crystal is based on two key features in such crystals. First, as typical in any non-linear bulk material, group velocities of the input fundamental pulse and of the output frequency-converted pulse are different along the same propagation path. This causes temporal walk-off between these two pulses. Second, a quasi-phasematched crystal can be designed so that frequency conversion (e.g. second-harmonic generation) for different input wavelengths can be localized at a different spatial position along the pulse propagation path. This can be achieved by using chirped rather than conventional unchirped QPM gratings. When launched into such a crystal, bandwidth-limited pulse at fundamental wavelength will produce frequency-converted (second-harmonic) pulses with a frequency chirp. This frequency chirp can be chosen by the design of the crystal to match the sign and the magnitude of the dispersion of the compensating components.

The duration of this second-harmonic (SH) pulse $\Delta T$ is determined by the magnitude of the group-velocity walk-off: $\Delta T = L/\upsilon_{SH} - L/\upsilon_{Fund}$. Here, L is the length of the crystal and $\upsilon_{SH}$, $\upsilon_{Fund}$ are the group-velocities at second-harmonic and fundamental wavelengths. The frequency-bandwidth $\Delta n$ of the SH pulse is given by the magnitude of the QPM period variation (chirp bandwidth). The dispersion required to compensate this frequency chirp is equal to $\Delta T/\Delta n$. Launching fundamental pulse from two opposite directions would result in second-harmonic pulses with opposite signs of frequency-chirp.

Chirped PPLN 60 is a crystal with a chirped inverted-domain grating, induced by electric-field poling. For 1550 nm pumping and 780 nm second-harmonic, the group-velocity walk-off is ~300 fs/mm. The bandwidth of a chirped PPLN can be several tens of nanometers. This is sufficient to generate prestretched second-harmonic pulses that can be compensated further in an optical system using approximately one to few meters of optical fiber.

FIG. 3 illustrates the configuration of an optical fiber delivery apparatus according to the second embodiment of the present invention. In FIG. 3, the optical pulses are generated by a chirped optical pulse source 11 with a sufficient chirp to avoid significant non-linearities through single-mode fiber 30. A chirped PPLN 70 is placed after the single-mode fiber 30. Consequently, the fundamental frequency is transmitted through the single-mode fiber 30, and the chirped PPLN 70 compensates for the chirp from the chirped optical pulse source 11 and the single-mode fiber 30. One advantage of using a PPLN for both frequency conversion and pulse compression is that pulses of even higher peak power may be delivered to the measurement device at the frequency converted wavelength, due on the fact that the frequency converted light is not re-injected into optical fiber.

In contrast, for laser sources without chirp, such as the optical pulse source of the first embodiment (FIG. 2), it may be preferable to first frequency convert with a chirped quasi-phasematched grating (chirped PPLN 60). Then, the single-mode fiber 30 recompresses the chirp on the frequency converted pulse.

Thus, a PPLN can be placed either before or after the optical fiber or, when there is multiple frequency conversion devices, they can be on both ends of the optical fiber. The advantage of the chirped quasi-phasematched material is that the proper chirp can be engineered into the material.

FIG. 4 illustrates the optical fiber delivery apparatus according to the third embodiment of the present invention. As shown in FIG. 4, a frequency converter 80 is interconnected between the optical pulse source 10 and the stretcher 20, so that the frequency converter 80 changes the frequency of the light prior to transmission through single-mode fiber 30. The frequency converter 80 changes the frequency of the light so that the optical pulse transmitted to the optical device 50 may be the suitable frequency for the optical device 50. FIG. 5 illustrates another arrangement of the optical fiber delivery apparatus according to the third embodiment of the present invention. In FIG. 5, the frequency converter 80 is interconnected between the compressor 40 and the optical device 50.

As shown in FIGS. 4 and 5, the frequency converter 80 can be either before of after the delivery optical fiber. In some systems, it is preferable to have the frequency converter before the optical fiber, since frequency conversion normally has an efficiency of less than 50%, and this inefficiency lowers the peak power and hence the non-linearities in the optical fiber. In other systems it is preferable to have the frequency converter after the optical fiber, since the optical fiber can then have positive and negative dispersion at the wavelengths of erbium doped optical fiber lasers, so that special optical fiber can be used for dispersion compensation. The most common frequency conversion is frequency doubling; however this optical fiber delivery system can be used with optical parametric generation (OPG) and optical parametric amplification (OPA) and also a combination of multiple frequency conversion including doubling with OPG, OPA and/or frequency difference mixing.

The frequency converter of the fourth and fifth embodiments can be used with the erbium-doped modelocked optical fiber laser described above. Specifically, the laser source may be frequency-doubled in order to create optical pulses having a wavelength of approximately 780 nm using a doubling crystal. These shorter wavelength pulses are coherent with the input 1550 nm pulses generated by the laser source, therefore retaining the phase information of the input pulses. Consequently, it is possible to design the ultrashort pulsed oscillator and optical fiber delivery to pre-compensate at 1550 nm for the dispersion experienced by the ~780 nm light through the optical path of the measurement or imaging system. This is important because, as pointed out earlier, light generated around 780 nm will experience only one sign of dispersion in optical components and therefore it is impossible to perform the type of flexible compensation described herein without the ability to access both signs of dispersion.

Optical fiber delivery of the output of a laser source has several benefits. These include the ability to maintain stable alignment and spatial filtering of multimode input when using single-mode optical fiber for the input wavelength. Optical fiber delivery of an input signal to an optical system has these benefits, and also provides for ease of changing the input by changing an optical fiber pigtail. As previously stated, optical fiber can have different signs of dispersion, depending upon the launched wavelength and the optical fiber design. Therefore, an optical fiber pigtail added to the output of a laser can provide further compensation to the type of dispersion launched, while allowing for ease of alignment into an optical system. This also allows for adjustment by the user, pre-calibrated during manufacture of the ultrashort pulse laser source.

Although several exemplary embodiments have been herein shown and described, those of skill in the art will recognize that many modifications and variations are possible without departing from the spirit and scope of the invention, and it is intended to measure the invention only by the appended claims.

What is claimed is:

1. An apparatus for delivering ultrashort optical pulses with high peak power to an optical device, comprising:
   an optical pulse source;
   a pulse stretcher which receives ultrashort optical pulses having high peak power from said optical pulse source and which expands a pulse width of the optical pulses; and
   an optical fiber which transmits the expanded optical pulses over a desired length, said optical fiber having a dispersion that compensates for other dispersions in the apparatus and the optical device, such that the optical pulses are fully recompressed at a desired point in the optical device.

2. The apparatus according to claim 1, wherein the pulse stretcher is one of: a chirped optical fiber Bragg grating, a diffraction grating pair, and a prism pair.

3. The apparatus according to claim 1, wherein the optical fiber is a single-mode optical fiber.

4. The apparatus according to claim 1, wherein the optical fiber is an amplifying optical fiber.

5. The apparatus according to claim 1, wherein said optical fiber compresses the pulse width of the optical pulses transmitted therethrough to provide high peak power optical pulses to the optical device, such that the optical pulses are fully recompressed at a desired point in the optical device.

6. The apparatus according to claim 1, wherein the optical device is a a two-photon laser scanning microscope used to analyze a sample.

7. The apparatus according to claim 6, wherein the optical fiber compensates for dispersion caused by said microscope, such that the optical pulses are fully recompressed at the sample.

8. The apparatus according to claim 1, further comprising a frequency converter disposed downstream of said optical pulse source, said frequency converter converting a frequency of the optical pulses generated by said optical pulse source to a frequency required by the optical device.

9. An apparatus for delivering ultrashort optical pulses with high peak power to an optical device, comprising:
a pulse stretcher which receives ultrashort optical pulses having high peak power and which expands a pulse width of the optical pulses;
an optical fiber which transmits the expanded optical pulses over a desired length;
a pulse compressor which compresses the pulse width of the optical pulses transmitted through the optical fiber, and which introduces a dispersion that compensates for other dispersions in the apparatus and the optical device, such that the optical pulses are fully recompressed at a desired point in the optical device.

10. The apparatus according to claim 9, wherein the pulse compressor is one of: a chirped optical fiber Bragg grating, a diffraction grating pair, and a prism pair.

11. An apparatus for delivering ultrashort optical pulses with high peak power to an optical device, comprising:
a periodically poled non-linear frequency converter which receives ultrashort optical pulses having high peak power, said periodically poled non-linear frequency converter expanding a pulse width of the optical pulses and changing a frequency of said optical pulses; and
an optical fiber which transmits the optical pulses over a desired length, said optical fiber having a dispersion that compensates for other dispersions in the apparatus affecting the optical pulses, such that the optical pulses are fully recompressed at a desired point in the optical device.

12. The apparatus according to claim 11, wherein the optical fiber is a single-mode optical fiber.

13. The apparatus according to claim 11, wherein the optical fiber is an amplifying optical fiber.

14. The apparatus according to claim 11, wherein said optical fiber compresses the pulse width of the optical pulses transmitted therethrough to provide high peak power optical pulses to the optical device, such that the optical pulses are fully recompressed at a desired point in the optical device.

15. The apparatus according to claim 11, further comprising a pulse compressor which compresses the pulse width of the optical pulses transmitted through said optical fiber, such that the optical pulses are fully recompressed at a desired point in the optical device.

16. The apparatus according to claim 15, wherein the pulse compressor is one of: a chirped optical fiber Bragg grating, a diffraction grating pair, and a prism pair.

17. The apparatus according to claim 11, wherein the optical device is a two-photon laser scanning microscope used to analyze a sample.

18. The apparatus according to claim 17, wherein the optical fiber compensates for dispersion caused by said microscope, such that the optical pulses are fully recompressed at the sample.

19. The apparatus according to claim 11, wherein said periodically poled non-linear frequency converter is a periodically-poled lithium niobate (PPLN) crystal.

20. An apparatus for producing ultrashort optical pulses with high peak power, comprising:
a pulse stretcher which receives ultrashort optical pulses and which expands a pulse width of the optical pulses;
an amplifying medium which amplifies the optical pulses, said amplifying medium having a dispersion that compensates for other dispersions in the apparatus affecting the optical pulses; and
a pulse compressor including a periodically poled non-linear frequency converter which compresses a pulse width of said optical pulses and which changes a frequency of said optical pulses.

21. An apparatus for delivering ultrashort optical pulses with high peak power to an optical device, comprising:
an optical fiber which receives chirped optical pulses and which transmits the optical pulses over a desired length; and
a periodically poled non-linear frequency converter which receives the optical pulses from said optical fiber, said periodically poled non-linear frequency converter compressing a pulse width of the optical pulses and changing a frequency of said optical pulses,
said optical fiber having a dispersion that compensates for other dispersions in the apparatus affecting the optical pulses, such that the optical pulses are fully recompressed at a desired point in the optical device.

22. The apparatus according to claim 21, wherein the optical fiber is an amplifying optical fiber.

23. The apparatus according to claim 21, wherein the optical fiber is a single-mode optical fiber.

24. The apparatus according to claim 21, wherein said optical fiber compresses the pulse width of the optical pulses transmitted therethrough to provide high peak power optical pulses to the optical device, such that the optical pulses are fully recompressed at a desired point in the optical device.

25. The apparatus according to claim 21, wherein the optical device is a two-photon laser scanning microscope used to analyze a sample.

26. The apparatus according to claim 25, wherein the optical fiber compensates for dispersion caused by said microscope, such that the optical pulses are fully recompressed at the sample.

27. The apparatus according to claim 21, wherein said periodically poled non-linear frequency converter is a periodically-poled lithium niobate (PPLN) crystal.

28. A method for delivering ultrashort optical pulses with high peak power to an optical device, comprising the steps of:
generating ultrashort optical pulses having high peak power;

stretching a pulse width of the optical pulses;

transmitting the optical pulses over an optical fiber;

compressing the pulse width of the optical pulses transmitted through said optical fiber by compensating for dispersion, including dispersion caused by said optical device; and delivering the optical pulses to the optical device.

29. The method according to claim 28, further comprising the step of frequency converting a frequency of the optical pulses generated in said generating step to a frequency required by the optical device.

30. The method according to claim 29, wherein the frequency converting step is performed prior to the transmitting step.

31. The method according to claim 29, wherein the frequency converting step is performed after the transmitting step.

32. An apparatus for delivering ultrashort optical pulses with high peak power to an optical device, comprising:

a pulse stretcher which receives ultrashort optical pulses having high peak power and which expands a pulse width of the optical pulses;

an optical fiber which transmits the expanded optical pulses over a desired length and which introduces a dispersion that compensates for other dispersions in the apparatus and the optical device, such that the optical pulses are fully recompressed at a desired point in the optical device.

33. An apparatus for delivering ultrashort optical pulses with high peak power to an optical device, comprising:

a source of chirped optical pulse;

a dispersion compensator for compensating the chirp of said pulses, and including at leastone jof a compressor and an optical fiber which introduces a dispersion that compensates for other dispersions in the apparatus and the optical device, such that the optical pulses are fully recompressed at a desired point in the optical device.

\* \* \* \* \*